US008635617B2

(12) United States Patent
Adler

(10) Patent No.: US 8,635,617 B2
(45) Date of Patent: Jan. 21, 2014

(54) TRACKING REQUESTS THAT FLOW BETWEEN SUBSYSTEMS USING TRANSACTION IDENTIFIERS FOR GENERATING LOG DATA

(75) Inventor: Stephan Adler, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 517 days.

(21) Appl. No.: 12/894,854

(22) Filed: Sep. 30, 2010

(65) Prior Publication Data

US 2012/0084779 A1      Apr. 5, 2012

(51) Int. Cl.
    G06F 9/46        (2006.01)
(52) U.S. Cl.
    USPC ........................................................ 718/100
(58) Field of Classification Search
    None
    See application file for complete search history.

(56) References Cited

U.S. PATENT DOCUMENTS

| | | | |
|---|---|---|---|
| 6,820,261 B1* | 11/2004 | Bloch | 718/100 |
| 7,058,928 B2 | 6/2006 | Wygodny | |
| 7,392,505 B2 | 6/2008 | Ciapala | |
| 7,401,141 B2 | 7/2008 | Carusi | |
| 7,606,802 B2* | 10/2009 | Gebhart et al. | 1/1 |
| 7,716,652 B2 | 5/2010 | Smith | |
| 7,958,217 B2* | 6/2011 | Egi et al. | 709/223 |
| 8,028,201 B2* | 9/2011 | Anna et al. | 714/45 |
| 8,095,830 B1* | 1/2012 | Cohen et al. | 714/45 |
| 2006/0075408 A1* | 4/2006 | Powers et al. | 718/100 |
| 2007/0050425 A1* | 3/2007 | Ichikawa et al. | 707/201 |
| 2007/0225943 A1 | 9/2007 | Marano | |

OTHER PUBLICATIONS

Sigelman, Benjamin H., et al., "Dapper, a Large-Scale Distributed Systems Tracing Infrastructure", Google Technical Report dapper—Jan. 2010, Apr. 2010, 14 pages.
Bhatia, Sapan, et al., "Lightweight, High-Resolution Monitoring for Troubleshooting Production Systems", 8th USENIX Symposium on Operating Systems Design and Implementation, Apr. 2010, pp. 103-116.
Boulon, Jerome, et al., "Chukwa: A large-scale monitoring system", 2008, 5 pages.

* cited by examiner

*Primary Examiner* — Meng An
*Assistant Examiner* — Eric C Wai
(74) *Attorney, Agent, or Firm* — Workman Nydegger

(57) ABSTRACT

The present invention extends to methods, systems, and computer program products for tracking requests that flow between subsystems. Embodiments of the invention facilitate following a user interaction/transaction from the point of entry through any subsystems that are called until the interaction/transaction is fulfilled. Generated information (e.g., log data) regarding a transaction can be aggregated across all subsystems, such as, for example, in a central repository. When failures occur, log and trace levels can be automatically increased for subsequent calls.

18 Claims, 5 Drawing Sheets

TRACKING REQUESTS THAT FLOW BETWEEN SUBSYSTEMS USING TRANSACTION IDENTIFIERS FOR GENERATING LOG DATA

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments (often referred to as a "distributed system").

Each machine in a distributed system can be configured to perform one or more local computations for a computing task and then forward the computer task onto other machines system for further computations. As such, a computing task can be passed between a plurality of different computer systems prior to completion. For example, delivering a service (application) to customers can include several subsystems, such as, for example, Web services, jobs, databases, etc. Based on the load on these subsystems, the subsystems can be run on a significant number (e.g. hundreds) of machines spread across multiple data centers. Further, each subsystem can be load balanced across a number of machines so as to not overload any one machine.

Each subsystem can be configured to generate log files and trace information related to the computations it performs. However, each subsystem can generate different log files and trace information and use different data formats. From time to time, one or more subsystems can error resulting in less than optimal results for a computing task. In many cases, the cause of an error can be derived from logging and tracing information based on timestamps at one or more machines. However, even utilizing timestamps, it can be difficult to obtain logging and tracing information for a computing task as it flows through a number of different distributed and load balanced machines.

Even if logging and tracing information can be obtained from different machines, different machines may lack of relevant data or different data formats can make it difficult to match up local computations from different machines with a specified computing task. For example, if different machines store information under different (or even just differently formatted) identifiers there may be no easy way to correlate tracing and logging information from different machines. One typical mechanism for correlating logging and tracing information from different machines includes manually issuing full text searches across logs.

For example, FIG. 4 depicts log traces at four different subsystems that have performed computations as part of a larger computing task. At subsystem 401, component data 411 is one portion of data that can be used to identify an association with the larger computing task. At subsystem 402, component data 411 is still present. Further, PIUDLow 412 and PUIDHigh 413 have been assigned values. Thus, PIUDLow 412 and PUIDHigh 413 can also be used to identify an association with the larger computing task. At subsystem 403, component data 416 no longer matches component data 411. PIUDLow 412 and PUIDHigh 413 are still present. Further, other identifying data has been encoded in other data 419. Thus, other data 419 can also be used to identify an association with the larger computing task. At subsystem 404, component data 421 is not assigned a value and thus no longer matches component data 411 nor component data 416. PIUDLow 422 and PUIDHigh 423 are assigned zero and thus no longer match PIUDLow 412 and PUIDHigh 413 respectively. Other data 419 is still present.

Thus, it can be possible to determine that log traces from subsequent subsystems correspond to the same specific computing task. For example, it is possible to determine that the log traces from subsystem 401 and subsystem 402 correspond to the same specific task through reference to component data 411. However, it is difficult and labor intensive to determine that log traces from larger groups of interconnected subsystems correspond to the same specific computing task. For example, it would be difficult to match the log trace form subsystem 401 with the log trace from subsystem 404 since there are no matching fields between them. To do so would require matching data between log traces in a sequenced chain of log traces from different subsystems, such as, for example, from subsystem 404 to 403, then subsystem 403 to 402 and then subsystem 402 to 401. Each match between log traces also typically requires manual entry of search criteria, which is prone to human error.

Additionally, as the number of issued computing tasks and distributed load balanced machines increases, difficulties can be significantly compounded due to the quantity of logging and tracing information being generated. For example, in some environments, a distributed system processes thousands of computing tasks per minute, each of which traverse some path across hundreds of load balanced machines in various different (e.g., geographically located) data centers. Correlating logging and tracing information from different machines for an individual computing task in these environments is, if even possible, labor intensive and prone to errors. Accordingly, it can be especially difficult to diagnose errors in these environments.

Many distributed systems always have a certain amount of errors that occur during operation without impairing the user experience. To gather enough information, these distributed systems usually use Information or even Trace level logging at all times. However, having logging active at all times results in significant (and typically unnecessary) amounts of data, which bloats log files.

BRIEF SUMMARY

The present invention extends to methods, systems, and computer program products for tracking requests that flow between subsystems. A first subsystem receives a user request to perform a computing task. The first subsystem is one subsystem included at a plurality of interconnected machines within a distributed system. The first subsystem generates a transaction identifier for the computing task. The first subsystem assigns the transaction identifier to the computing task. The transaction identifier is configured to move along with the computing task as communication for the computing task flows between different subsystems within the distributed system.

The first subsystem performs one or more computations for the computing task. The first subsystem generates log information for the one or more computations. The first subsystem stores the transaction identifier along with the generated log information in a first log. The first subsystem communicates with a second subsystem to initiate performance of a further computation for the computing task at the second subsystem. The communication notifies the second subsystem of the transaction identifier. Accordingly, the second subsystem is made aware that the transaction identifier is to be associated with any generated log data for the computing task.

The second subsystem performs the further computation for the computing task. The second subsystem generates further log information for the further computation. The second subsystem stores the transaction identifier along with the generated further log information in a second log. When appropriate, the second subsystem can communicate the transaction identifier to a third subsystem.

A central repository can be configured to aggregate log information from the plurality of interconnected machines. For each subsystem in the distributed system, the central repository accesses log information from a subsystem log for the subsystem. Each log entry contains a transaction identifier identifying a computing task that corresponds to the log entry. The central repository can organize data on a per computing task basis by grouping log information containing the same transaction identifier together.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
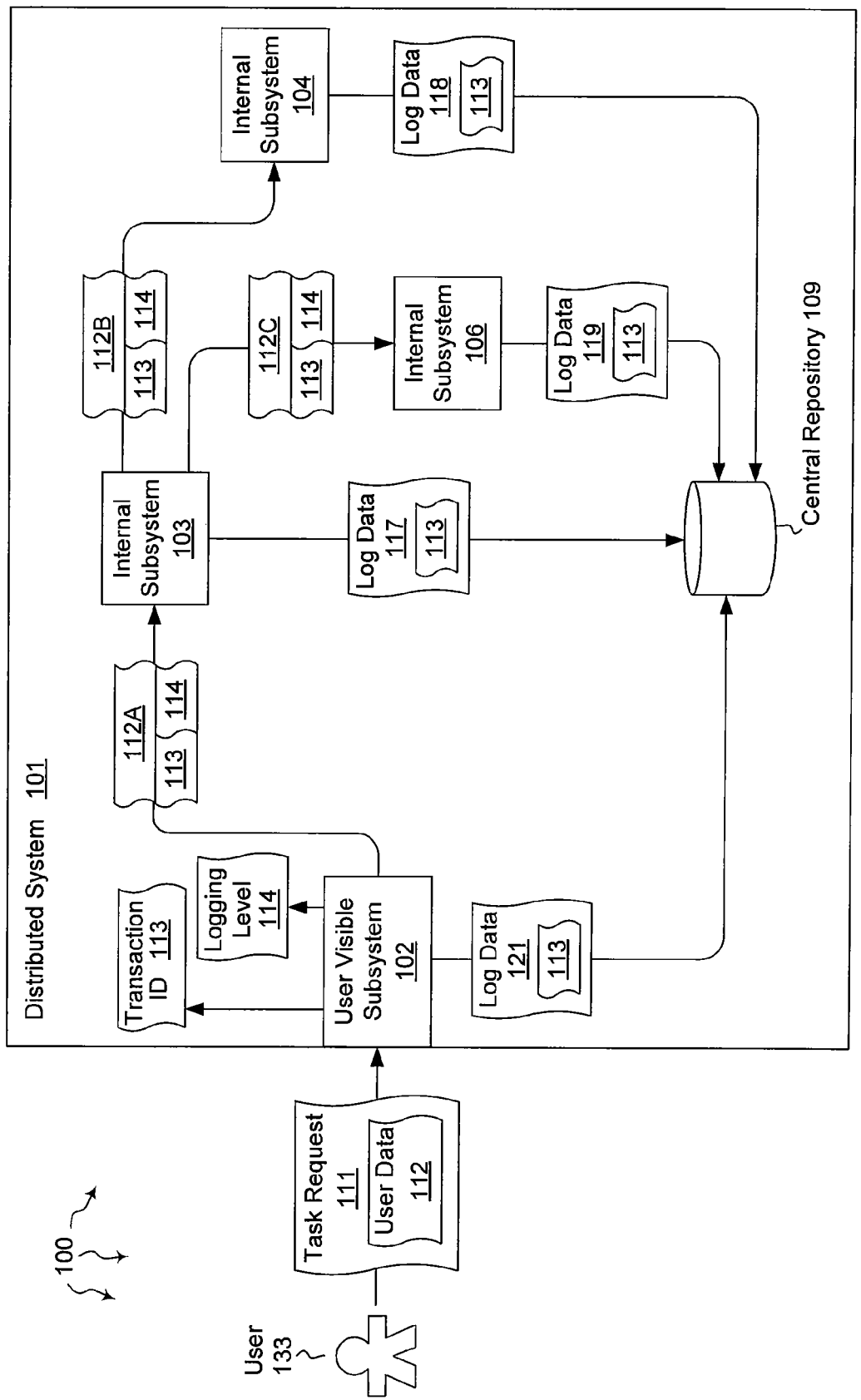
FIG. 1 illustrates an example computer architecture that facilitates tracking requests that flow between subsystems.

The present invention extends to methods, systems, and computer program products for tracking requests that flow between subsystems. A first subsystem receives a user request to perform a computing task. The first subsystem is one subsystem included at a plurality of interconnected machines within a distributed system. The first subsystem generates a transaction identifier for the computing task. The first subsystem assigns the transaction identifier to the computing task. The transaction identifier is configured to move along with the computing task as communication for the computing task flows between different subsystems within the distributed system.

The first subsystem performs one or more computations for the computing task. The first subsystem generates log information for the one or more computations. The first subsystem stores the transaction identifier along with the generated log information in a first log. The first subsystem communicates with a second subsystem to initiate performance of a further computation for the computing task at the second subsystem. The communication notifies the second subsystem of the transaction identifier. Accordingly, the second subsystem is made aware that the transaction identifier is to be associated with any generated log data for the computing task.

The second subsystem performs the further computation for the computing task. The second subsystem generates further log information for the further computation. The second subsystem stores the transaction identifier along with the generated further log information in a second log. When appropriate, the second subsystem can communicate the transaction identifier to a third subsystem.

A central repository can be configured to aggregate log information from the plurality of interconnected machines. For each subsystem in the distributed system, the central repository accesses log information from a subsystem log for the subsystem. Each log entry contains a transaction identifier identifying a computing task that corresponds to the log entry. The central repository can organize data on a per computing task basis by grouping log information containing the same transaction identifier together.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates tracking requests that flow between subsystems. Referring to FIG. 1, computer architecture 100 includes distributed system 101 and user 103. Distributed system 101 can include a plurality of interconnected machines. User visible subsystem 102, internal subsystem 103, internal subsystem 104, internal subsystem 106, and central repository 109 can be running on one or more of the interconnected machines. Each of the depicted components can be connected to one another over (or is part of) a system bus and/or a network, such as, for example, a Local Area Network ("LAN"), a Wide Area Network ("WAN"), and even the Internet. Accordingly, each of the depicted computer components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the system bus and/or network.

Generally, user visible subsystem 102 exposes the functionality of a specified computing task implemented within distributed system 101. Performance of the specified computing task can include performing one or more computations at each of user visible subsystem 102, internal subsystem 103, internal subsystem 104, and internal subsystem 106. Each of the subsystems 102, 103, 104, and 106 can be virtually any kind of service, such as, for example, a Web service, As each subsystem performs computations, the subsystem can generate log data indicating potential problems with the functionality of the subcomponent. In some embodiments each subsystem logs log data directly into central repository 109. In other embodiments, each subsystem logs data in an individual subsystem log. In these other embodiments, log data from individual subsystem logs can later be transferred to central repository 109 or aggregated in some other way. Aggregated log data (whether in central repository 109 or using other mechanisms) can be used to provide a unified view of logging information for distributed system 101.

Each subsystem can allow different log levels to define the granularity of log file entries: Error, Warning, Info, Trace, for example, where Error is the highest (least detailed) and Trace is the lowest (most detailed) level of logging.

Figure 2:
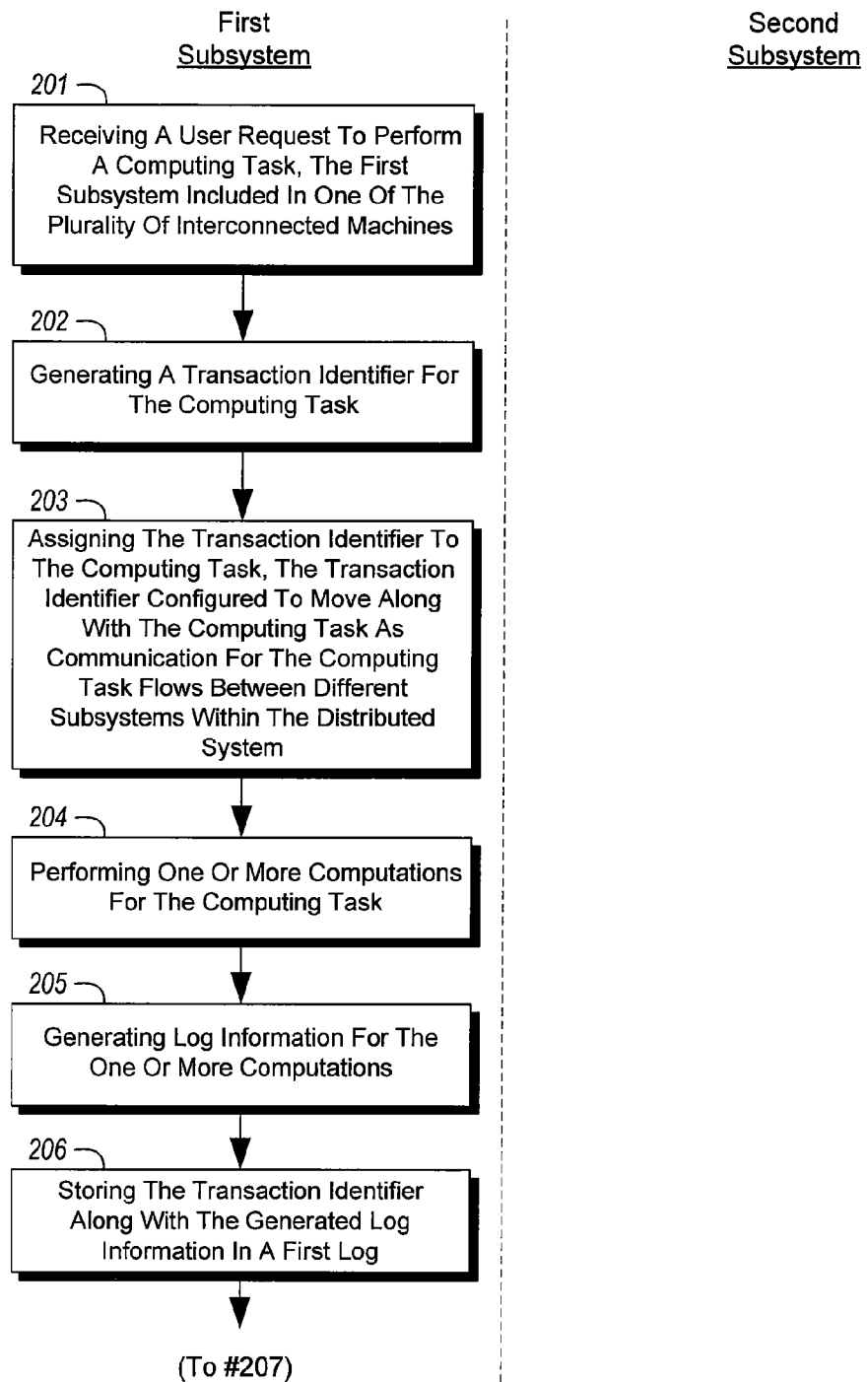
FIG. 2 illustrates a flow chart of an example method for tracking requests that flow between subsystems.
Figure 2:
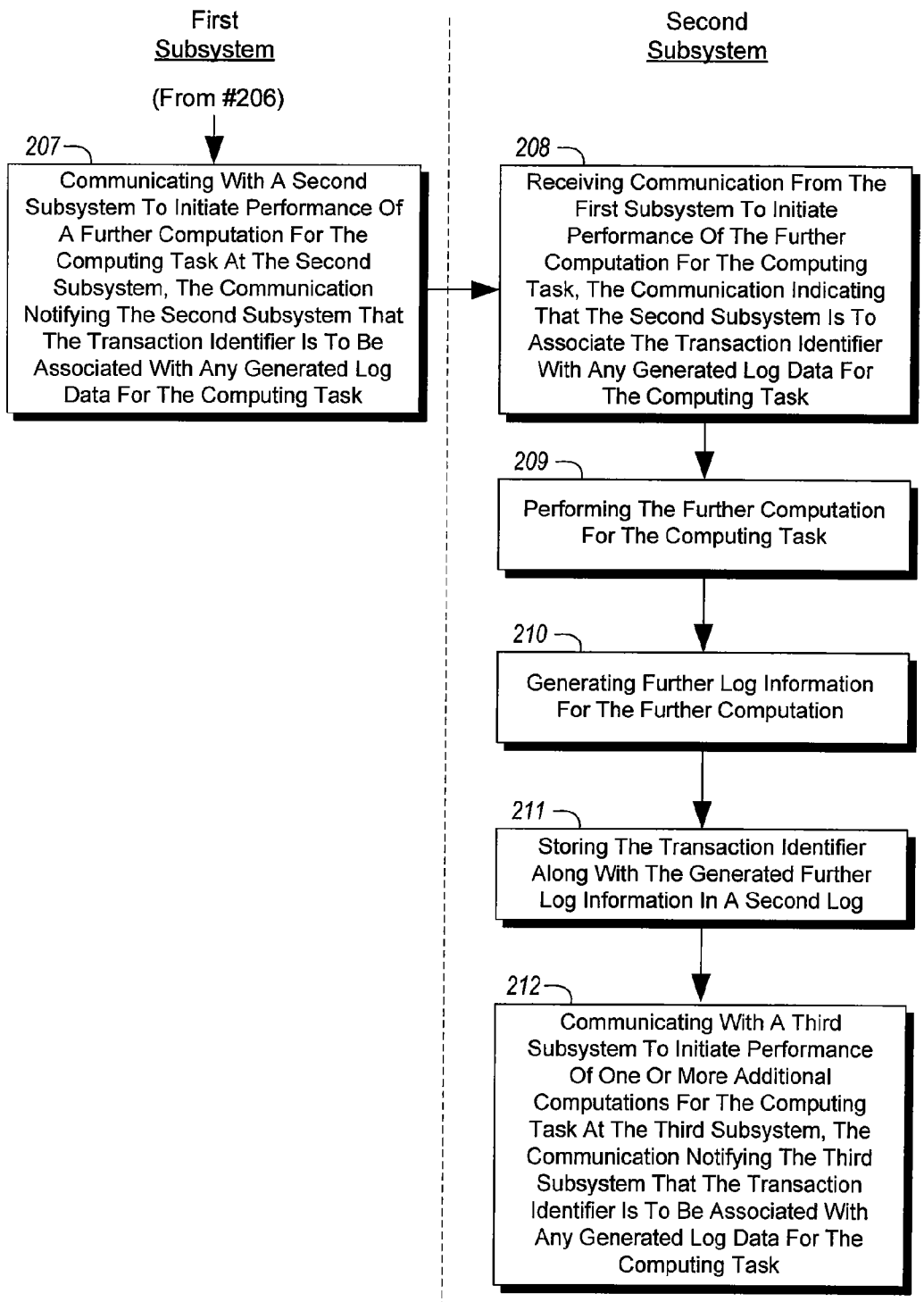

FIG. 2 illustrates a flow chart of an example method 200 for tracking requests that flow between subsystems. Method 200 will be described with respect to the components and data of computer architecture 100.

User 133 can formulate task request 111 (e.g., at a client computer system) and submit task request 111 to user visible subsystem 102. As depicted, task request 111 includes user data 112. Task request 111 can be a request to perform the specified computing task implemented within distributed system 101. Submitting task request 111 can include issuing a Web service call to user visible system 102.

Method 200 includes an act of a first subsystem receiving a user request to perform a computing task, the first subsystem included in one of the plurality of interconnected machines (act 201). For example, user visible subsystem 102 can receive task request 111 from user 133. User visible subsystem 102 can be included on one or more of the interconnected machines within distributed system 101.

Method 200 includes an act of the first subsystem generating a transaction identifier for the computing task (act 202). For example, in response to receiving task request 111, use visible subsystem 102 can generate transaction ID 113. Transaction 113 can be a unique context ID associated with a Web service call to user visible subsystem 102.

User visible subsystem 102 can also generate a logging level 114 defining a level of logging (error, warning, etc.) for generating log data for the specified computing task.

Method 200 includes an act of the first subsystem assigning the transaction identifier to the computing task, the transaction identifier configured to move along with the computing task as communication for the computing task flows between different subsystems within the distributed system (act 203).

For example, user visible subsystem 102 can assign transaction ID 113 along with logging level 114 to the specified computing task implemented within distributed system 101. Transaction identifier 113 (and logging level 114) is configured to move along with communication as the communication flows between different subsystems within distributed system 101.

Method 200 includes an act of the first subsystem performing one or more computations for the computing task (act 204). For example, user visible subsystem 102 can perform one or more computations for the specified computing task implemented within distributed system 101. As part of the one or more computations, user visible subsystem 102 can process user data 112 into data 112A.

Method 200 includes an act of the first subsystem generating log information for the one or more computations (act 205). For example, user visible subsystem 102 can generate log data 121 for one or more performed computations. Method 200 includes an act of the first subsystem storing the transaction identifier along with the generated log information in a first log (act 206). For example, user visible subsystem 102 can store transaction ID 113 along with log data 121 in a subsystem specific log or directly to central repository 109.

Method 200 includes an act of first subsystem communicating with a second subsystem to initiate performance of a further computation for the computing task at the second subsystem, the communication notifying the second subsystem that the transaction identifier is to be associated with any generated log data for the computing task (act 207). For example, user visible subsystem 102 can send data 112A, transaction ID 113, and logging level 114 to internal subsystem 103 to initiate performance of a further computation for the specified computing task implemented within distributed system 101. Data 112A, transaction ID 113, and logging level 114 collectively notifies internal subsystem 103 that transaction ID 113 is to be associated with any generated log data for the specified computing task. Internal subsystem 103 can be included on one or more of the interconnected machines within distributed system 101.

In some embodiments, transaction ID 113 and logging level 114 are not passed as method parameters for local calls. Other mechanisms are utilized to avoid extending existing method implementations. For local calls, transaction ID 113 and logging level 114 can be passed between subsystems using Thread Local Storage ("TLS") using HttpContext. For network calls, such as, for example, when a subsystem issues a Web service call to another subsystem, a calling subsystem can pass the Transaction ID and the Requested Logging Level along with other call parameters.

Other subsystems receiving transaction ID 113 and logging level 114 are obligated to add the Transaction ID to the log/trace entry and obey the Requested Logging Level.

Method 200 includes receiving communication from the first subsystem to initiate performance of the further computation for the computing task, the communication indicating that the second subsystem is to associate the transaction identifier with any generated log data for the computing task (act 207). For example, internal subsystem 103 can receive data 112A, transaction ID 113, and logging level 114 from user visible subsystem 102. Data 112A, transaction ID 113, and logging level 114 collectively indicate that internal subsystem 103 is to associate transaction ID 113 with any generated log data for the specified computing task implemented within distributed system 101.

Method 200 includes performing the further computation for the computing task (act 208). For example, internal subsystem 103 can perform one or more computations for the specified computing task implemented within distributed system 101. As part of the one or more computations, internal subsystem 103 can process data 112A into data 112B and 112C.

Method 200 includes generating further log information for the further computation (act 209). For example, internal subsystem 103 can generate log data 117 for one or more performed computations. Method 200 includes storing the transaction identifier along with the generated further log information in a second log (act 210). For example, internal subsystem 103 can store transaction ID 113 along with log data 117 in a subsystem specific log or directly to central repository 109.

Method 200 includes communicating with a third subsystem to initiate performance of one or more additional computations for the computing task at the third subsystem, the communication notifying the third subsystem that the transaction identifier is to be associated with any generated log data for the computing task (act 211). For example, internal subsystem 104 can send data 112B, transaction ID 113, and logging level 114 to internal subsystem 103 to initiate performance of a further computation for the specified computing task implemented within distributed system 101. Data 112B, transaction ID 113, and logging level 114 collectively notifies internal subsystem 104 that transaction ID 113 is to be associated with any generated log data for the specified computing task. Internal subsystem 104 can be included on one or more of the interconnected machines within distributed system 101.

Alternately or in combination, internal subsystem 104 can send data 112C, transaction ID 113, and logging level 114 to internal subsystem 106 to initiate performance of a further computation for the specified computing task implemented within distributed system 101. Data 112C, transaction ID 113, and logging level 114 collectively notifies internal subsystem 106 that transaction ID 113 is to be associated with any generated log data for the specified computing task. Internal subsystem 106 can be included on one or more of the interconnected machines within distributed system 101.

Subsequently, internal subsystem 104 can perform one or more computations for the specified computing task implemented within distributed system 101. As part of the one or more computations, internal subsystem 104 can process data 112B. Internal subsystem 104 can generate log data 118 for one or more performed computations. Internal subsystem 104 can store transaction ID 113 along with log data 118 in a subsystem specific log or directly to central repository 109.

Internal subsystem 106 can also perform one or more computations for the specified computing task implemented within distributed system 101. As part of the one or more computations, internal subsystem 106 can process data 112C. Internal subsystem 106 can generate log data 119 for one or more performed computations. Internal subsystem 106 can store transaction ID 113 along with log data 119 in a subsystem specific log or directly to central repository 109.

From time to time, data from subsystem logs (or other data center locations) can be pulled into central repository 109. Thus, for each subsystem in the distributed system 101, central repository 109 can access log information from a subsystem log for the subsystem. Each log entry can contain a transaction identifier identifying a computing task that corresponds to the log entry. Central repository can organize data on a per computing task basis by grouping log information containing the same transaction identifier together. For example, log data 117, 118, 119, and 121 can be grouped together since log data 117, 118, 119, and 121 contain transaction ID 113.

Thus, central repository 109 facilitates a transactional view on log data by matching the transaction IDs which are part of every entry in all log files. Central repository 109 includes various different levels of log data aggregation. For example, central repository 109 includes higher level log data aggregation on a per call (e.g., to user visible subsystem 102) basis. Central repository 109 also permits drilling down into the details of every call. Central repository 109 can aggregate per call information into a health view of distributed system 101. The health view can include, for example, statistical views, such as, a ratio of successful vs. unsuccessful calls and a break down into different error conditions on an interaction or per subsystem basis.

Figure 3:
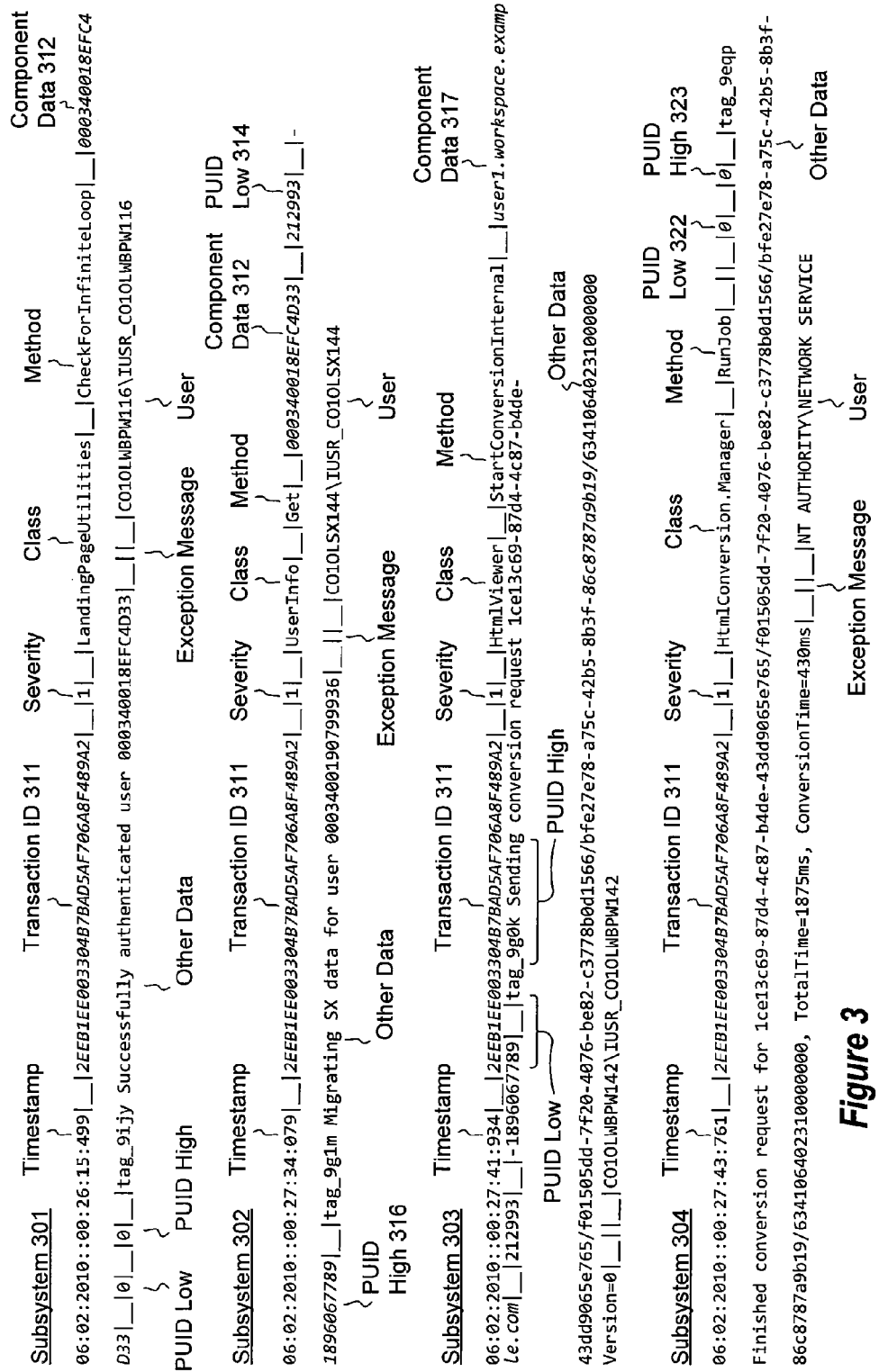
FIG. 3 is an example of log data, including a transaction identifier, for a plurality of different subsystems that each performs one or more computations for a computing task.
Figure 4:
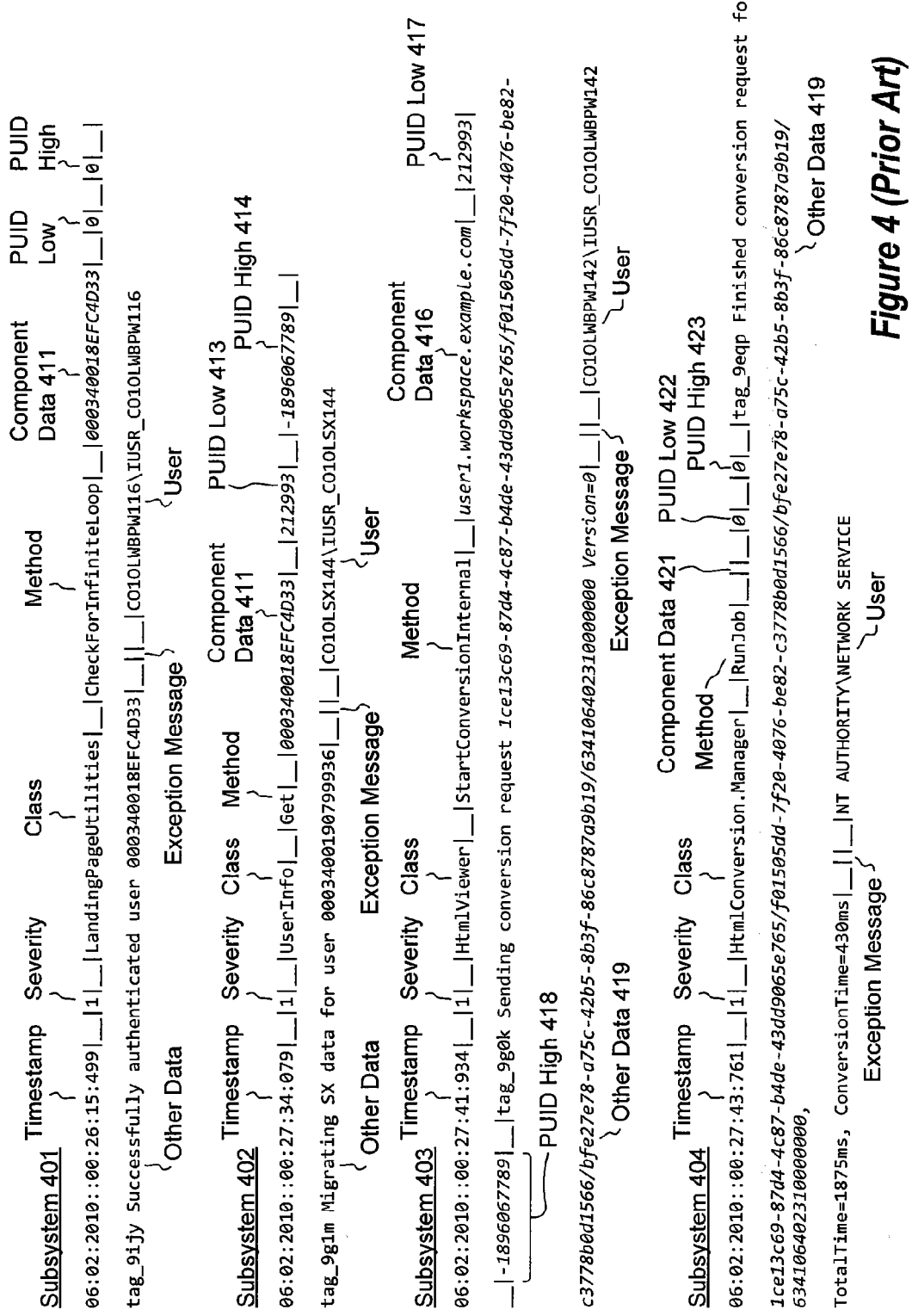
FIG. 4 (prior art) depicts log data from a plurality of different subsystems that perform computations for a computing task.

FIG. 3 is an example of log data, including a transaction identifier, for a plurality of different subsystems that each performs one or more computations for a computing task. As depicted, log traces for each of subsystems 301, 302, 303, and 304 include transaction ID 311. Transaction ID 311 can be a value assigned to a transaction ID field within a specified log data entry format. Based on transaction ID 311, the log traces from subsystems 301, 302, 303, and 304 can be more efficiently grouped together.

Further, the inclusion of transaction ID 311 also compensates for different values and/or different formats used in other field within in log data entries. For example, transaction ID 311 allows the log traces from subsystems 301 and 303 to be matched even though component data 312 and 317 differ. Further, transaction ID 311 allows the log traces from subsystems 302 and 304 to be matched even though PUIDLow 314 and PUIDHigh 316 differ from PUIDLow 322 and PUIDHigh 323 respectively. Additionally, transaction ID 311 allows the log traces from subsystems 301 and 304 to be directly matched even though they have no log data in common.

Embodiments also permit logging levels to be selectively adjusting based at least in part on errors received during past calls. For example, referring again to FIG. 1, it may be that on a previous call from internal subsystem 103 to internal subsystem 104, internal subsystem 103 received an error from internal subsystem 104. Internal subsystem 103 can store an indication of the previous error. When internal subsystem 103 interacts with internal subsystem 104 again, internal subsystem 103 can request trace level logging (and thus the generation of more log data) by adjusting a value for logging level 114.

Accordingly, embodiments of the invention facilitate following a user interaction/transaction from the point of entry through any subsystems that are called until the interaction/transaction is fulfilled. Generated information (e.g., log data) regarding a transaction can be aggregated across all subsystems. When failures occur, log and trace levels can be automatically increased for subsequent calls.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a distributed system, the distributed system including a plurality of interconnected machines, each of the plurality of interconnected machines including one or more subsystems, each subsystem configured to perform one or more computations, the distributed system including one or more processors and system memory, the distributed system configured to process computing tasks that include performing computations at two or more of the plurality of interconnected machines, a method for monitoring a computing task as computations are performed at the two or more machines, the method comprising:

an act of a first subsystem receiving a user request to perform the computing task, the first subsystem included in a first interconnected machine of the plurality of interconnected machines;

an act of the first subsystem generating a transaction identifier for the computing task;

an act of the first subsystem generating a logging level that defines a detail level of log data that is generated during computations on the computing task, the logging level being based on a prior error received from a second subsystem in connection with a previous call to the second subsystem;

an act of the first subsystem assigning the transaction identifier to the computing task, the transaction identifier configured to move along with the computing task as communication for the computing task flows between different subsystems within the distributed system;

an act of the first subsystem assigning the logging level to the computing task, the logging level configured to move along with the computing task as communication for the computing task flows between different subsystems within the distributed system;

an act of the first subsystem performing one or more computations for the computing task;

an act of the first subsystem generating log information for the one or more computations, the log information generated in accordance with the logging level;

an act of the first subsystem storing the transaction identifier along with the generated log information in a first log; and an act of first subsystem communicating with the second subsystem to initiate performance of a further computation for the computing task at the second subsystem, the communication notifying the second subsystem that the transaction identifier is to be associated with any generated log data for the computing task and that the second subsystem is to use the logging level for generating logging information for the computing task, the second subsystem included in a second interconnected machine of the plurality of interconnected machines.

2. The method as recited in claim 1, further comprising:

an act of the second subsystem performing the further computation for the computing task;

an act of the second subsystem generating further log information for the further computation;

an act of the second subsystem storing the transaction identifier along with the generated further log information in a second different log; and an act of second subsystem communicating with a third subsystem to initiate performance of one or more additional computations for the computing task at the third subsystem, the communication notifying the third subsystem that the transaction identifier is to be associated with any generated log data for the computing task, the third subsystem included in a third interconnected machine of the plurality of interconnected machines.

3. The method as recited in claim 2, wherein the act of the second subsystem generating further log information for the further computation comprises an act of the second subsystem generating further log information in compliance with the specified logging level.

4. The method as recited in claim 2, further comprising:
an act of the third subsystem performing the one or more additional computations for the computing task;
an act of the third subsystem generating additional log information for the one or more additional computations;
an act of the third subsystem storing the transaction identifier along with the generated additional log information in a third different log; and
an act of the third subsystem communicating with a fourth subsystem to initiate performance of an even further computation for the computing task at the fourth subsystem, the communication notifying the fourth subsystem that the transaction identifier is to be associated with any generated log data for the computing task, the fourth subsystem included in a fourth interconnected machine of the plurality of interconnected machines.

5. The method as recited in claim 1, wherein the act of the first subsystem communicating with a second subsystem to initiate performance of a further computation for the computing task at the second subsystem comprises an act of the first subsystem storing the transaction identifier in Thread-Local Storage ("TLS").

6. The method as recited in claim 5, further comprising the second subsystem accessing the transaction identifier from Thread-Local Storage ("TLS").

7. The method as recited in claim 1, wherein the act of the first subsystem communicating with the second subsystem to initiate performance of a further computation for the computing task at the second subsystem comprises an act of the first subsystem including the transaction identifier in a Web services call.

8. The method as recited in claim 7, further comprising the second subsystem accessing the transaction identifier from the Web services call.

9. A computer program product of use at a distributed system, the distributed system including a plurality of interconnected machines, each of the plurality of interconnected machines including one or more subsystems, each subsystem configured to perform one or more computations, the distributed system including one or more processors and system memory, the distributed system configured to process computing tasks that include performing computations at two or more of the plurality of interconnected machines, the computer program product for implementing a method for monitoring a computing task as computations are performed at the two or more machines, the computer program product comprising one or more computer storage devices having stored thereon computer-executable instructions that, when executed, at a processor, cause a first subsystem, from among the one or more subsystems, to:
receive a user request to perform the computing task, the first subsystem included in a first interconnected machine of the plurality of interconnected machines;
generate a transaction identifier for the computing task;
generate a logging level that defines a detail level of log data that is generated during computations on the computing task, the logging level being based on a prior error received from a second subsystem in connection with a previous call to the second subsystem;
assign the transaction identifier to the computing task, the transaction identifier configured to move along with the computing task as communication for the computing task flows between different subsystems within the distributed system;
assigning the logging level to the computing task, the logging level configured to move along with the computing task as communication for the computing task flows between different subsystems within the distributed system;
perform one or more computations for the computing task;
generate log information for the one or more computations, the log information generated in accordance with the logging level;
store the transaction identifier along with the generated log information in a first log; and
communicate with the second subsystem to initiate performance of a further computation for the computing task at the second subsystem, the communication notifying the second subsystem that the transaction identifier is to be associated with any generated log data for the computing task, and that the second subsystem is to use the logging level for generating logging information for the computing task, the second subsystem included in a second interconnected machine of the plurality of interconnected machines.

10. The computer program product as recited in claim 9, further comprising computer-executable instructions that, when executed cause the second subsystem to:
perform the further computation for the computing task;
generate further log information for the further computation;
store the transaction identifier along with the generated further log information in a second different log; and
communicate with a third subsystem to initiate performance of one or more additional computations for the computing task at the third subsystem, the communication notifying the third subsystem that the transaction identifier is to be associated with any generated log data for the computing task, third second subsystem included in a third interconnected machine of the plurality of interconnected machines.

11. The computer program product as recited in claim 10, wherein computer-executable instructions that, when executed, cause the first subsystem to generate a logging level that defines a detail level of log data that is generated during computations on the computing task comprise computer-executable instructions that, when executed, cause the first subsystem to generate the logging level based on a prior error received from the second subsystem in connection with a previous call to the second subsystem.

12. The computer program product as recited in claim 10, wherein computer-executable instructions that, when executed, cause the second subsystem to generate further log information for the further computation comprise computer-executable instructions that, when executed, cause the second subsystem to generate further log information in compliance with the specified logging level.

13. The computer program product as recited in claim 9, wherein computer-executable instructions that, when executed, cause the first subsystem to communicate with the second subsystem to initiate performance of a further computation for the computing task comprise computer-executable instructions that, when executed, cause the first subsystem to store the transaction identifier in Thread-Local Storage ("TLS").

14. The computer program product as recited in claim 13, further comprising computer-executable instructions that, when executed, cause the second subsystem to access the transaction identifier from Thread-Local Storage ("TLS").

15. The computer program product as recited in claim 9, wherein computer-executable instructions that, when executed, cause the first subsystem to communicate with the second subsystem to initiate performance of a further computation for the computing task comprise computer-executable instructions that, when executed, cause the first subsystem to include the transaction identifier in a Web services call.

16. The computer program product as recited in claim 15, further comprising computer-executable instructions that, when executed, cause the second subsystem to access the transaction identifier from the Web services call.

17. A distributed system, the distributed system comprising:
one or more processors;
system memory;
a plurality of interconnected machines, each of the plurality of interconnected machines including one or more subsystems, each subsystem configured to perform one or more computations wherein the plurality of interconnected machines are configured process computing tasks that include performing computations at two or more of the plurality of interconnected machines, wherein for a specified computing task each subsystem is configured to:
when a transaction identifier and logging level are assigned for the specified computing task, access the transaction identifier and logging level for the specified computing task, or when the transaction identifier and logging level are not assigned for the specified computing task, generate the transaction identifier and logging level for the specified computing task and assign the generated transaction identifier and logging level to the specified computing task, the transaction identifier configured to move along with the computing task as communication for the computing task flows between different subsystems within the distributed system, the logging level indicative of the level of logging the subsystem is to use to log information for the computing task, the logging level being based on a prior error received from a next subsystem at a different interconnected machine in connection with a previous call to the next subsystem;
perform one or more computations for the computing task;
generate log information for the one or more computations in compliance with the logging level;
store the transaction identifier along with the generated log information in a subsystem log; and
communicate with the next subsystem to initiate performance of a further computation for the computing task at the next subsystem, the communication notifying the next subsystem of the transaction identifier to indicate to the next subsystem that the transaction identifier is to be associated with any generated log data for the computing task and notifying the next subsystem of the logging level to indicate to the next subsystem that the logging level is to by used for generating logging information for the computing task; and
a central repository, the central repository configured to aggregate log information from the plurality of interconnected machines, including:
for each subsystem in the distributed system, access log information from a subsystem log for the subsystem, each log entry containing a transaction identifier identifying a computing task that corresponds to the log entry; and
organize data on a per computing task basis by grouping log information containing the same transaction identifier together.

18. The system as recited in claim 17, wherein the central repository is further configured to present a health view of the distributed system on a per subsystem basis.

\* \* \* \* \*